United States Patent
Zhou

(10) Patent No.: US 9,191,120 B2
(45) Date of Patent: Nov. 17, 2015

(54) METHOD AND SYSTEM FOR OPTICAL IMPAIRMENTS MITIGATION FOR HIGH-SPEED OPTICAL COMMUNICATION SYSTEMS

(71) Applicant: AT&T Intellectual Property I, L.P., Atlanta, GA (US)

(72) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 114 days.

(21) Appl. No.: 14/017,433

(22) Filed: Sep. 4, 2013

(65) Prior Publication Data

US 2015/0063818 A1 Mar. 5, 2015

(51) Int. Cl.
| | |
|---|---|
| H04B 10/516 | (2013.01) |
| H04B 10/06 | (2006.01) |
| H04J 14/02 | (2006.01) |
| H04B 10/2575 | (2013.01) |
| H04L 25/03 | (2006.01) |
| H04B 10/61 | (2013.01) |

(52) U.S. Cl.
CPC .......... *H04B 10/516* (2013.01); *H04B 10/2575* (2013.01); *H04B 10/61* (2013.01); *H04B 10/6164* (2013.01); *H04B 10/6165* (2013.01); *H04L 25/03* (2013.01); *H04L 25/0305* (2013.01)

(58) Field of Classification Search
CPC .............. H04B 10/6971; H04L 25/03178; H04L 25/03057
USPC ........................................................ 398/115
See application file for complete search history.

(56) References Cited

U.S. PATENT DOCUMENTS

| | | | | |
|---|---|---|---|---|
| 6,256,130 | B1 * | 7/2001 | Bulow ........................... | 398/141 |
| 8,233,809 | B2 * | 7/2012 | Qian et al. .................... | 398/208 |
| 2006/0013590 | A1 * | 1/2006 | Hueda et al. ................... | 398/149 |
| 2006/0013597 | A1 * | 1/2006 | Crivelli et al. ................ | 398/208 |
| 2007/0092260 | A1 * | 4/2007 | Bontu et al. ................... | 398/152 |
| 2007/0147850 | A1 * | 6/2007 | Savory et al. ................. | 398/208 |
| 2008/0069191 | A1 * | 3/2008 | Dong et al. .................... | 375/219 |
| 2008/0273641 | A1 * | 11/2008 | Yang et al. ..................... | 375/359 |
| 2009/0324224 | A1 * | 12/2009 | Xie .................................. | 398/65 |
| 2010/0119241 | A1 * | 5/2010 | Yang et al. ..................... | 398/208 |
| 2010/0329677 | A1 * | 12/2010 | Kaneda et al. ................... | 398/65 |

(Continued)

FOREIGN PATENT DOCUMENTS

| | | |
|---|---|---|
| CN | 104106229 A | 10/2014 |
| WO | 2013119897 A1 | 8/2013 |

OTHER PUBLICATIONS

X.Zhou, et al.; "8X450-Gb/s, 50-GHz-spaced, PDM-32QAM transmission over 400km and one 50GHz-grid ROADM"; OFC-NFOEC 2011; Mar. 2011; pp. 1-3; paper PDPB3; Los Angeles, CA.

(Continued)

*Primary Examiner* — Oommen Jacob
(74) *Attorney, Agent, or Firm* — Chiesa Shahinian & Giantomasi PC

(57) ABSTRACT

A method and system for simultaneous mitigation of optical impairment from both equalizer-phase noise interaction (EPNI) and fiber nonlinear effects (FNE) is disclosed. In one embodiment, the method is directed to simultaneous mitigation of optical impairment from both equalizer-phase noise interaction (EPNI) and fiber nonlinear effects (FNE) using a fast-adaptive multi-tap digital filter.

20 Claims, 7 Drawing Sheets

(56) References Cited

U.S. PATENT DOCUMENTS

2011/0064421 A1\* 3/2011 Zhang et al. ............... 398/208
2012/0155881 A1\* 6/2012 Zhao et al. .................. 398/81

OTHER PUBLICATIONS

T. Kobayashi, et al.; "Nonlinear tolerant long-haul WDM transmission over 1200km using 538Gb/s/ch PDM-64QAM SC-FDM signals with pilot tone"; OFC-NFOEC 2011; Mar. 2012; pp. 1-3; paper OM2A.5; Los Angeles, CA.

P.J. Winzer, et al.; "Generation and 1,200-km transmission of 448-Gb/sETDM 56-Gbaud PDM 16-QAM using a single I/Q modulatpr"; ECOC 2010; Sep. 2010; pp. 1-3; PDP 2.2; Torino, Italy.

X. Li, et al.; "Electronic post-compensation of WDM transmission impairments using coherent detection and digital signal processing,"; Opt. Express; Jan. 2008; pp. 881-888; vol. 16, No. 2.

Eduardo F. Mateo, et al.; "Selective Post-Compensation of Nonlinear Impairments in Polarization—Division Multiplexed WDM Systems with Different Channel Granularities"; IEEE Journal of Quantum Electronics; Jan. 2011; pp. 109-116; vol. 47, No. 1.

Zhaoyi Pan, et al.; "Volterra Filtering for Nonlinearity Impairment Mitigation in DP-16QAM and DP-QPSK Fiber Optic Communications Systems,"; OFC 2011; pp. 1-3; paper ThA40.

L.B. Du, et al.; "Fiber nonlinearity compensation for OFDM super-channels using optical phase conjugation"; Opt. Express 20; 2012; pp. 19921-19927.

Eduardo F. Mateo, et al.; "Electronic phase conjugation for nonlinearity compensation in fiber communication systems"; OFC 2011; pp. 1-3; paper JWA025.

A.J. Viterbi, et al.; "Nonlinear estimation of PSK-modulated carrier phase with application to burst digital transmission"; IEEE Trans. Inf. Theory; Jul. 1983; pp. 543-551; vol. IT-29, No. 4.

X. Zhou, et al.; "An improved feed-forward carrier recovery algorithm for coherent receiver with M-QAM modulation format"; IEEE Photonics Technol. Lett.; Jul. 15, 2011; pp. 1051-1053; vol. 22, No. 14.

T. Pfau, et al.; "Phase-Noise-Tolerant Two-Stage Carrier Recovery Concept for Higher Order QAM Formats,"; IEEE J. Selected Topics in Quantum Electronics; Sep./Oct. 2010; pp. 1210-1216; vol. 16, No. 5.

W. Shieh, et al., "Equalization-enhanced phase noise for coherent-detection systems using electronic digital signal processing," Optics Express; pp. 15718-15727; vol. 16, No. 20.

Chongjin Xie; "WDM coherent PDM-QPSK systems with and without inline optical dispersion compensation"; Optics Express; Mar. 16, 2009; pp. 4815-4823; vol. 17, No. 6.

Qunbi Zhuge, et al; "Experimental investigation of the equalization enhanced phase noise in long haul 56 Gbaud DPQPSK systems"; Optics Express; pp. 13841-13846; vol. 20, No. 13.

Giulio Colavolpe, et al.; "Impact of Phase Noise and Compensation Techniques in Coherent Optical Systems"; J. Lightwave Techno.; 2011; pp. 2790-2799; vol. 29, No. 18.

William Shieh, et al.; "Interaction of Laser Phase Noise with Differential-Mode-Delay in Few-mode Fiber Based MMO Systems", OFC 2012; pp. 1-3; paper OTu2C.6.

Extended European Search Report mailed on Mar. 2, 2015, in connection with European Patent Application No. 14183432.5, 10 pgs.

Zhou et al., "Multi-Level, Multi-Dimensional Coding for High-Speed and High-Spectral-Efficiency Optical Transmission," Aug. 15, 2009, Journal of Lightwave Technology, vol. 27, No. 16, pp. 3641-3653.

Adib et al., "Equaliazation & Carrier Recovery for 112GBPS Optical Coherent System with HEX-16-QAM Modulation," Dec. 20, 2012, 7th International Conference on Electrical & Computer Engineering (ICECE), pp. 559-562.

Zhou et al., "Digital Signal Processing for High-Spectral-Efficiency Optical Transmission," Jul. 5, 2010, Optoelectronics and Communications Conference, pp. 122-123.

Zhou et al., "Advanced DSP for 400 Gb/s and Beyond Optical Networks," Aug. 15, 2014, Journal of Lightwave Technology, vol. 32, No. 16, pp. 2716-2725.

\* cited by examiner

METHOD AND SYSTEM FOR OPTICAL IMPAIRMENTS MITIGATION FOR HIGH-SPEED OPTICAL COMMUNICATION SYSTEMS

BACKGROUND

The popularity of multimedia communications services over packet data networks, such as the Internet, continues to grow. Consequently, the demand for higher capacity in core data transport networks continues to grow. For service providers, core data transport networks are typically optical networks based on fiber optic technology. To meet the ever-growing capacity demand, 100 G/s per channel data rate operating at 2 bit/s/Hz spectral efficiency (SE) by using quadrature phase shift keying in the pulse-density (PDM-QPSK) modulation and digital signal processing (DSP) enabled coherent detection has been commercially deployed in the existing core networks. Also, research for the next generation of transport systems operating at even higher data rate (likely at 400 Gb/s or above) and higher SE by using more spectrally efficient high-order modulation formats (such as the well known quadrature amplitude modulation (QAM)) is underway. However, recent experimental results have revealed that it is extremely challenging to achieve long-reach transmission using high-order modulation formats because they are more vulnerable to various transmission impairments such as fiber nonlinear effects, laser phase noise, and amplifier noise.

To address the challenge caused by fiber nonlinear effects, several digital nonlinear compensation methods have been proposed, including the digital backward-propagation (DBP) based methods and a Volterra-based nonlinear equalization method. However, the implementation complexity of these digital methods is prohibitively high, making it almost impossible for them to be realized for any practical high-speed transmission systems. Several mid-link phase-conjugation based methods have also been proposed. However, these methods generally work well only for point-to-point submarine systems or specially designed super-channel systems. For typical terrestrial optical networks where reconfigurable optical add/drop multiplexers (ROADMs) are used to route optical wavelengths and different wavelength channels usually end up at different locations, there is still no feasible solution to mitigate fiber nonlinear effects for high-speed coherent optical transmission systems.

To reduce the impact of laser phase noise on system performance, several single-tap phase rotation filter (with fast adaptive rate) based phase recovery methods have been proposed. However, these methods only work well for systems without using long-memory equalizer at the receiver, i.e. the short-reach system or long-reach system using inline optical dispersion compensation. Because the use of inline optical dispersion compensation not only increases the complexity of the inline optical amplifier design, but also significantly reduces fiber nonlinear tolerance, purely electrical/digital dispersion compensation is usually required in a high-speed coherent optical transmission system. For such a communication system, a linear digital filter/equalizer with very long memory length has to be introduced at the receiver to compensate for the accumulated dispersion from the transmission fiber.

BRIEF SUMMARY

It has been determined that the use of long-memory filter/equalizer at the receiver (or at the transmitter for pre-compensation) will not only enhance the received phase noise, but will also convert the phase noise into amplitude noise, causing additional signal distortion which cannot be mitigated using the traditional carrier phase recovery method. Moreover, it has been determined that the penalty from such an equalizer-phase noise interaction increases with the data rate and can pose a problem for future 400-Gb/s systems operating at a very high baud rate. To address this problem, a hardware-based laser phase noise compensation method has recently been proposed. However, this method is very complex and costly because it requires an additional set of coherent receiver to measure the laser phase noise.

The present disclosure is generally directed to a DSP-based solution to reduce transmission impairments such as fiber nonlinear effects, laser phase noise, and amplifier noise for long-reach transmission of signals using high-order modulation formats. In one embodiment, a method and system is directed to a single fast-adaptive multi-tap digital filter for simultaneous mitigation of optical impairment from both equalizer-phase noise interaction (EPNI) and fiber nonlinear effects (FNE). In another embodiment, the method and system is directed to the use of single fast-adaptive multi-tap digital filter to perform the common phase recovery function in addition to simultaneous mitigation of optical impairment from both EPNI and FNE.

DETAILED DESCRIPTION

The present disclosure is directed to a method and system for simultaneous mitigation of optical impairment from both equalizer-phase noise interaction (EPNI) and fiber nonlinear effects (FNE). In one embodiment, the method is directed to simultaneous mitigation of optical impairment from both equalizer-phase noise interaction (EPNI) and fiber nonlinear effects (FNE) using a fast-adaptive multi-tap digital filter.

Figure 1:
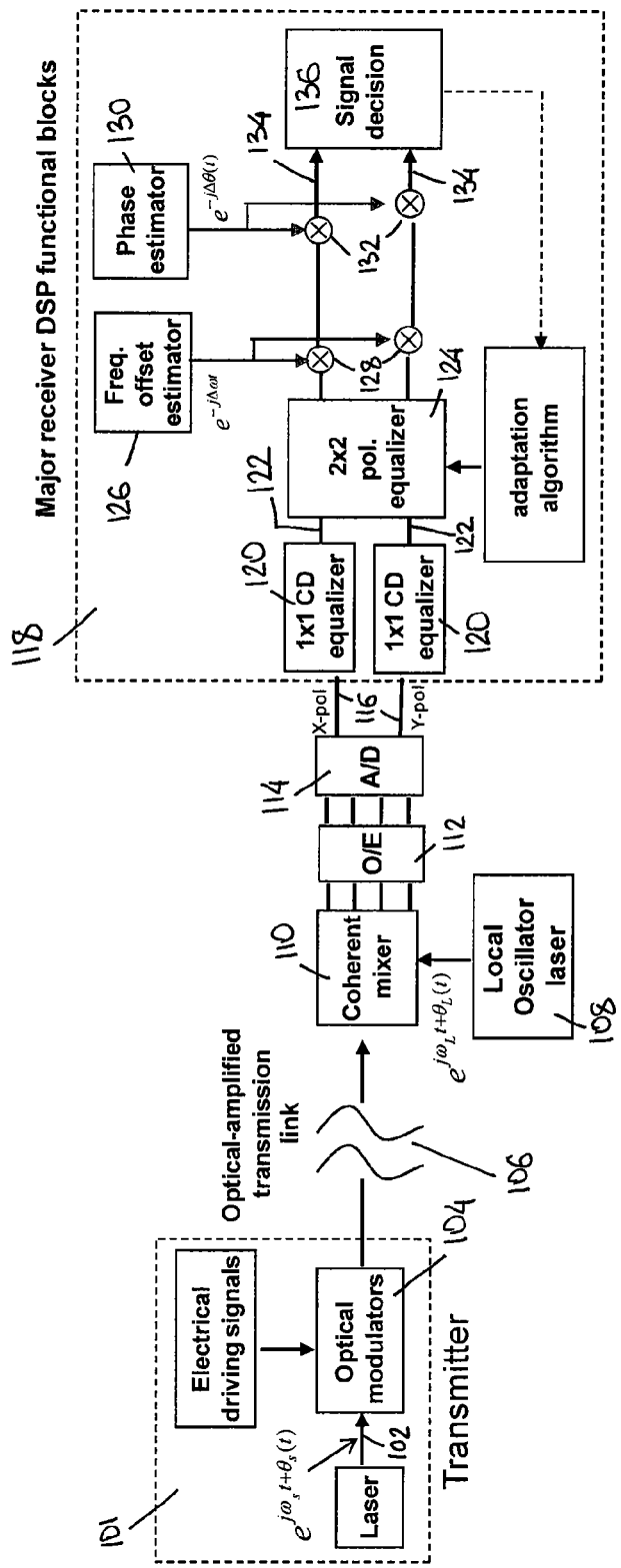
FIG. 1 illustrates a DSP-enabled coherent optical communication system, according to one embodiment.

FIG. 1 illustrates a DSP-enabled coherent optical communication system according to one embodiment. Specifically, FIG. 1 illustrates a DSP-enabled coherent optical communication system where a transmitter laser 102 with carrier frequency $w_s$ and phase noise $\theta s(t)$ is modulated by an optical modulator 104. The modulated optical signal is then transmitted through an optical-amplified transmission link 106 to coherent mixer 110 where the optical signal is coherently mixed with a continuous wave (CW) light emitted from a local oscillator (LO) 108 with carrier frequency $w_L$ and phase noise denoted as θL(t). After mixing in coherent mixer 110, the in-phase and quadrature components at two orthogonal polarizations (nominally denoted as X-pol and Y-pol) of the received signal are converted, using an optical-to-electrical converter 112, into analog electrical signals, which are then digitized by analog-to-digital converter 114. The digitized signals 116 are then sent to a DSP unit 118 for signal recovery and demodulation.

The process of signal recovery and demodulation using DSP unit 118 consists of five steps. First, the received digitized signal 116 at each polarization is sent to a long-memory 'static' linear filter/equalizer 120 for fiber chromatic dispersion (CD) compensation. In one embodiment, as shown in FIG. 1, the received digitized signal 116 could be presented as a plurality of signals, each signal having its own polarization. In the case of the plurality of signals, the DSP receiver may include a plurality of the long-memory 'static' linear filter/equalizers 120, each of the long-memory 'static' linear filter/equalizers 120 configured to receive and process the signal having its own polarization. In another embodiment, the received digitized signal 116 could be presented as a single signal having separate channels for each polarization (not shown). In the case of the single signal, a DSP receiver may include a long-memory 'static' linear filter/equalizer 120 may be a single long-memory 'static' linear filter/equalizer 120 configured to receive and process a single signal having separate channels for each polarization. It is to be understood that in the case of the single signal, channels occupy different frequency bands.

The CD-compensated signals 122 then pass through a butterfly-configured 2×2 adaptive equalizer 124 for polarization recovery and residual dispersion compensation. It is to be understood that the CD-compensated signals 122 may be presented as either a plurality of signals, as shown in FIG. 1, or as a single signal having a plurality of channels (not shown). Because the rate of polarization change is much slower than the symbol rate (4 to 6 orders of magnitude slower), the required adaptive rate can be relatively slow, allowing the use of decision-directed adaptive equalization algorithms even with the use of high degree of time-interleave based parallel processing. Carrier frequency and phase recovery are performed following the polarization recovery. For carrier frequency recovery, the carrier frequency offset between the signal source and the LO, i.e., Δw in FIG. 1, is estimated using a frequency offset estimator 126 and then removed using a one-tap phase-rotation filter 128. For carrier phase recovery, the total phase noise (from the signal source and the LO) is estimated by using one of several algorithms, such as described in the "Nonlinear estimation of PSK-modulated carrier phase with application to burst digital transmission," A. J. Viterbi and A. M. Viterbi, IEEE Trans. Inf. Theory, vol. IT-29, no. 4, July 1983, "An improved feed-forward carrier recovery algorithm for coherent receiver with M-QAM modulation format," X. Zhou, IEEE Photonics Technol. Lett., Vol. 22, No. 14, pp. 1051-1053, Jul. 15, 2010, and "Phase-Noise-Tolerant Two-Stage Carrier Recovery Concept for Higher Order QAM Formats," T. Pfau and R. No'e, IEEE J. SELECTED TOPICS IN QUANTUM ELECTRONICS, VOL. 16, NO. 5, pp. 1210-1216, September/October 2010, using a phase estimator 130 and then removed using another one-tap phase rotation filter 132. The phase-recovered signal 134 is then sent to the decision-making unit 136 for final signal demodulation.

The DSP functions described above work well for a liner transmission system using extremely narrow line-width lasers. For a practical fiber transmission system using a narrow line width laser operating in the range from 100 kHz to 1 MHz, however, there exist two major problems. First, the fiber system is not a linear system, and the Kerr nonlinear effect will cause additional signal distortion which is not compensated for or mitigated by using the conventional coherent receiver design as shown in FIG. 1. Secondly, the long-memory filter used in the receiver for the CD compensation will not only enhance the LO phase noise, but also convert the LO phase noise into amplitude noise. The long-memory CD-compensating filter will not enhance the phase noise from the signal source because the signal source passes through both the transmission fiber and the CD-compensating filter. For the case of perfect CD compensation, the fiber dispersion and the CD-compensating filter will cancel out the impact from each other. On the contrary, the LO only passes through the CD-compensating filter so the impact from this filter cannot be canceled out. Such additional signal distortion caused by the interaction between the equalizer and the LO phase noise cannot be compensated for or mitigated by using the conventional one-tap phase-rotation filter as is shown in FIG. 1.

The signal distortion caused by both EPNI and FNE are correlated over multiple symbol periods. The symbol period is the time-domain duration for each data pulse. A time-varying multi-tap linear filtering process can be used to model both EPNI and FNE (to the first order). In one embodiment, a fast-adaptive multi-tap digital filter replaces the conventional one-tap phase rotation filter. Such a fast-adaptive multi-tap filter performs not only the normal phase recovery function, but also helps reduce the penalty due to additional signal distortion caused by EPNI and FNE.

Figure 2:
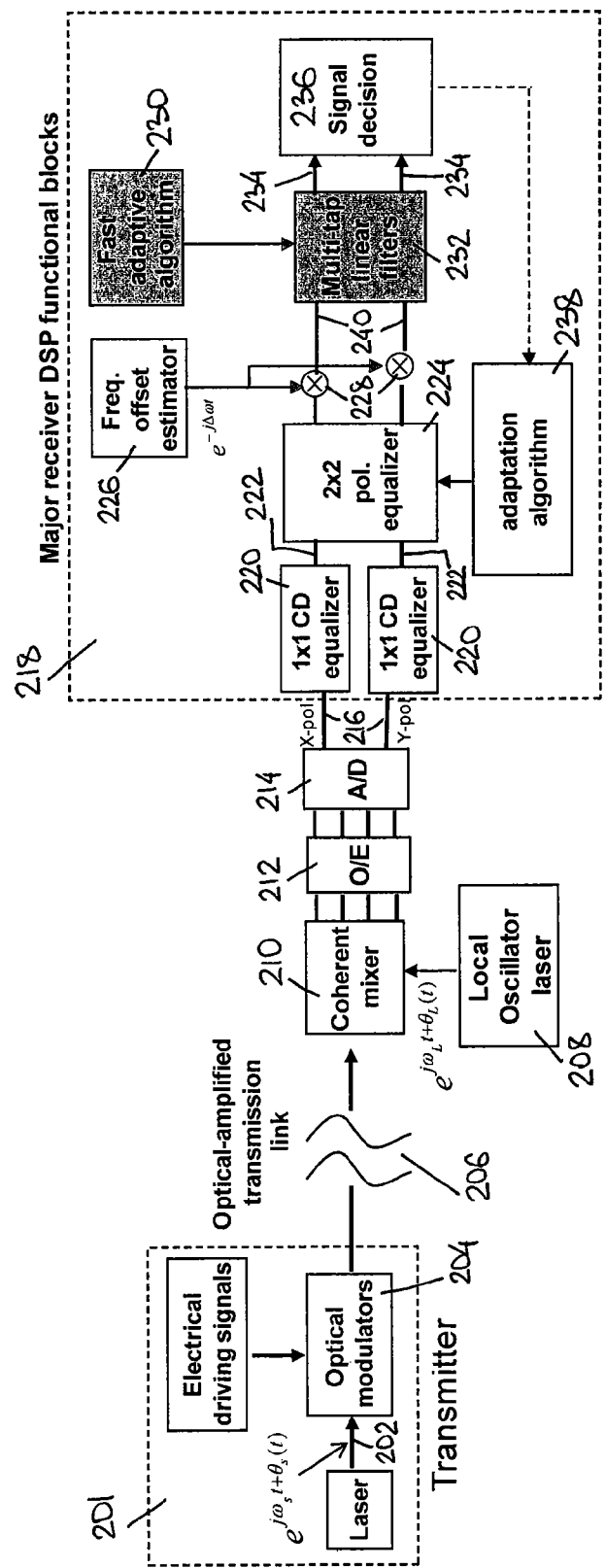
FIG. 2 illustrates a system for optical impairment mitigation for high-speed optical communication systems, according to one embodiment.

FIG. 2 illustrates a DSP-enabled coherent optical communication system for optical impairment mitigation using the fast-adaptive multi-tap digital filter according to one embodiment. Transmitter laser 202 with carrier frequency $w_s$ and phase noise θs(t) is modulated by an optical modulator 204 of a transmitter 201. The modulated optical signal is then transmitted through an optically-amplified transmission link 206 to coherent mixer 210 where the modulated optical signal is then coherently mixed with a CW light emitted from a local oscillator (LO) 208 with carrier frequency $w_L$ and phase noise denoted as θL(t). After mixing in coherent mixer 210, the in-phase and quadrature components at two orthogonal polarizations (nominally denoted as X-pol and Y-pol) of the received signal are converted into analog electrical signals using an optical-to-electrical converter 212. The electrical signals are then digitized using analog-to-digital converter 214. The digitized signals 316 are sent to a DSP unit 218 for signal recovery and demodulation.

In the DSP unit 218 the received digitized signal 216 at each polarization is sent to a long-memory 'static' linear filter/equalizer 220 for fiber chromatic dispersion (CD) compensation. The CD-compensated signals 222 are then passed through a butterfly-configured 2×2 adaptive equalizer 224 for polarization recovery and residual dispersion compensation. As noted above, because the rate of polarization change (<1 MHz) is much slower than the symbol rate (10-100 GHz, 4 to 6 orders of magnitude slower), the required adaptive rate can be relatively slow, allowing the use of decision-directed adaptive equalization algorithms even with the use of high degree of time-interleave based parallel processing. Carrier frequency and phase recovery are performed following the polarization recovery. For carrier frequency recovery, the carrier frequency offset between the signal source and the LO, (i.e., Δw) is estimated using a frequency offset estimator 226 and then removed from the signal outputted from the butterfly-configured 2×2 adaptive equalizer 224 using a one-tap phase-rotation filter 228. The total phase noise is estimated by using a fast-adaptive multi-tap digital filter 232. Because laser phase noise typically varies 2 to 4 orders of magnitude faster than the state of polarization change (tens of microseconds versus tens of nanoseconds), the adaption rate for the fast-adaptive multi-tap digital filter 232 should be much faster than the regular polarization equalizer. A high adaptation rate can be realized using feed-forward based adaptation algorithms, such as, a block-by-block least square (LS) based algorithm, where the received data stream is divided into consecutive blocks, and filter coefficients of the said multi-tap filter are assumed to be constant over each data block, which may consist of tens to hundreds of consecutive data symbols. The changes of the filter coefficients from one block to the following block are estimated using LS based algorithms. To reduce the impact of imperfect decision accuracy, multiple iterations may be applied to each data block for filter coefficients update. The phase-recovered signal 234 is then sent to the decision-making unit 236 for final signal demodulation.

Figure 3:
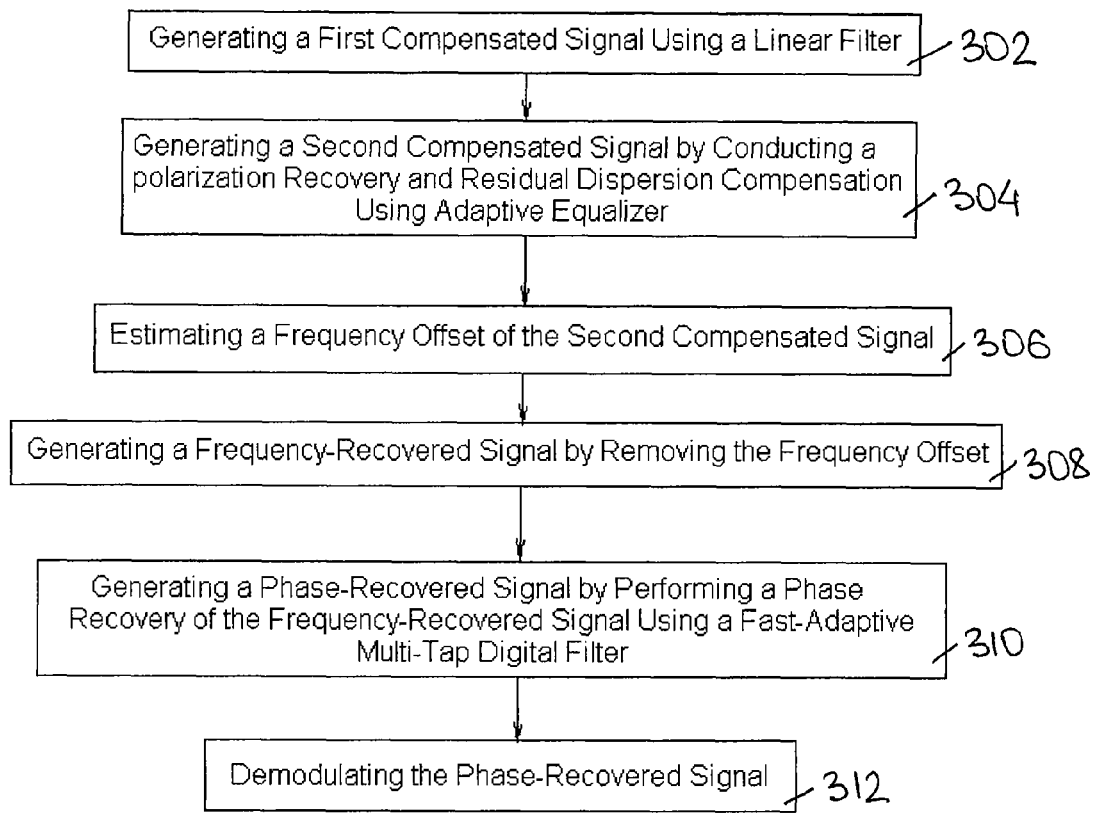
FIG. 3 illustrates a flow-chart showing a method for optical impairment mitigation for high-speed optical communication systems, according to one embodiment.

FIG. 3 illustrates a method for an optical impairment mitigation using a fast-adaptive multi-tap filter in the DSP-enabled coherent optical communication system as shown in FIG. 2. At step 302, a first compensated digitized signal is generated using a linear filter. Specifically, the first compensated digitized signal is generated by sending a received digitized signal at each polarization to a long-memory 'static' linear filter/equalizer for fiber chromatic dispersion (CD) compensation. In one embodiment, the received digitized signal is signal 216 of FIG. 2 and the long-memory 'static' linear filter/equalizer for fiber chromatic dispersion (CD) compensation is one or more 1×1 CD equalizers 220 of FIG. 2.

At step 304, a second compensated signal is generated by conducting a polarization recovery and residual dispersion compensation using an adaptive equalizer. In one embodiment, the polarization recovery and residual dispersion compensation is performed by passing the first compensated digitized signal through a butterfly-configured 2×2 adaptive equalizer. In one embodiment, step 304 is presented in FIG. 2 as signal 222 being transmitted to butterfly-configured 2×2 adaptive equalizer 224 for polarization recovery and residual dispersion compensation where the signal output from the butterfly-configured 2×2 adaptive equalizer 224 is the second compensated signal of step 304. It should be noted that because the rate of polarization change is much slower than the symbol rate (4 to 6 orders of magnitude slower), the required adaptive rate can be relatively slow, allowing the use of decision-directed adaptive equalization algorithms even with the use of high degree of time-interleave based parallel processing. In one embodiment, the adaptation algorithm processor 238 of FIG. 2 runs the decision-directed adaptive equalization algorithm for the polarization recovery and residual dispersion compensation. At step 306, a frequency offset of the second compensated signal is estimated. In one embodiment, step 306 is performed as part of a carrier frequency recovery performed following the polarization recovery. In one embodiment, for the carrier frequency recovery, the carrier frequency offset Δw between the signal source and the LO is estimated using frequency offset estimator 226 of FIG. 2.

At step 308, the frequency-recovered signal is generated by removing the frequency offset of the second compensated signal. In one embodiment, the carrier frequency offset Δw is removed by one or more single-tap filters 228 of FIG. 2. In one embodiment, the removal of the carrier frequency offset Δw in step 308 results in generation of frequency-recovered signal 240 of FIG. 2.

At step 310, a phase-recovered signal is generated by performing a phase recovery of the frequency-recovered signal using a fast-adaptive multi-tap digital filter. As noted above, the adaption rate for the proposed fast-adaptive multi-tap digital filter should be much faster than the regular polarization equalizer because laser phase noise typically varies 2 to 4 orders of magnitude faster than the state of polarization change (tens of microseconds versus tens of nanoseconds). In one embodiment, a fast adaptation rate is achieved by using feed-forward based adaptation algorithms run on fast adaptive algorithm processor 230 of FIG. 2. In one embodiment, a classic block-by-block least square (LS) based algorithm is used as the feed-forward based adaptation algorithm.

The method for an optical impairment mitigation of FIG. 3 concludes with step 312 where the phase-recovered signal generated at step 310 is demodulated.

Figure 4:
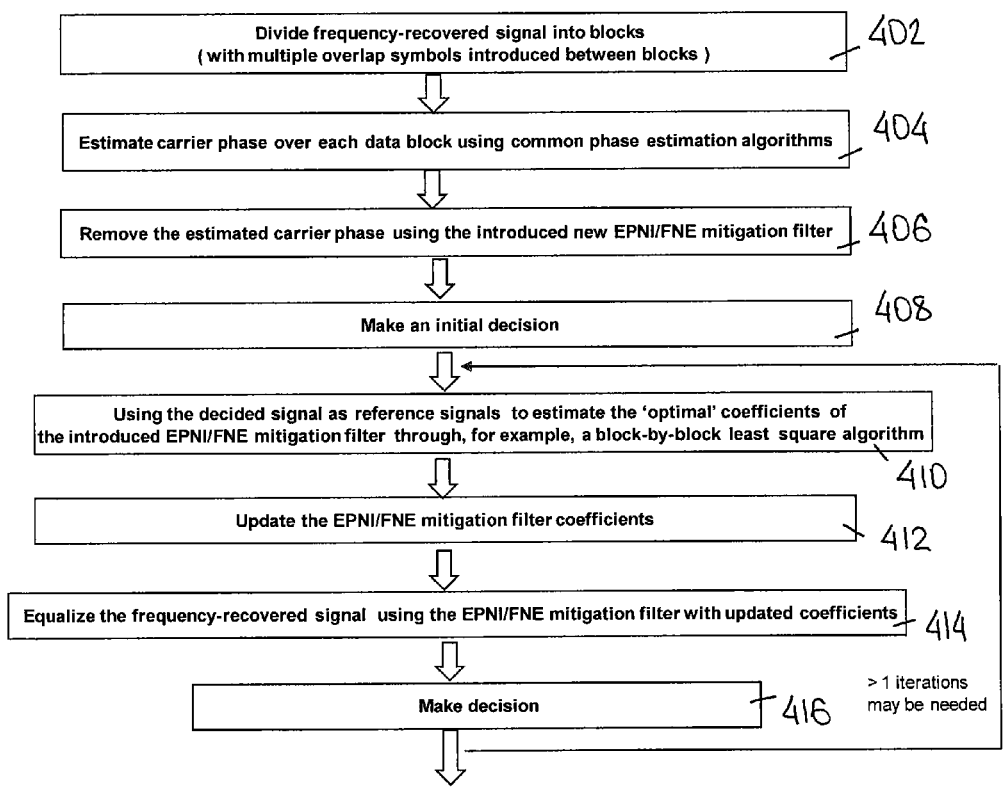
FIG. 4 illustrates an exemplary flow-chart showing a block-by-block based feed-forward adaption solution for fast adaption of the fast-adaptive multi-tap digital filter, according to one embodiment.

FIG. 4 illustrates an exemplary block-by-block based feed-forward adaption solution for fast adaption of the fast-adaptive multi-tap digital filter 232 of FIG. 2.

At step 402, the frequency-recovered signal, generated at step 308 of FIG. 3, is divided into blocks having multiple overlap symbols introduced between the blocks. At step 404, a carrier phase over each block is estimated using common phase estimation algorithms, where the phase noise is assumed to be a constant over a multiple symbol period and it is also assumed that there is negligible phase noise to amplitude noise conversion. At step 406, an estimated carrier phase is removed using the fast-adaptive multi-tap digital filter 232 of FIG. 2.

At step 408, an initial decision is made. A person skilled in the art would understand that "the decision" means the process in which a receiver determines the value of transmitted symbols in a signal. For example, if the transmitter sends "10101" to the receiver by pulse amplitude modulation, due to the noise corruption, the receiver needs to make a decision as to which pulse symbol has a value of "1" and which pulse symbol has a value of "0." In one embodiment, the initial decision is made based on performing strictly phase recovery over a current data block. But the initial decision may also be made by applying the recovered phase of a prior data block to the current data block or by directly applying the EPNI/FNE filter coefficients acquired from the prior data block to the current data block, where the starting phase or EPNI/FNE coefficients may be obtained using a starting training sequence. Since the block length cannot be too large due to the need for rapid adaption, accumulated amplifier noise may degrade the performance of the fast-adaptive multi-tap digital filter. This drawback may be alleviated by joint optimization of the fast-adaptive multi-tap digital filter at both polarizations because the phase noise in X- and Y-polarization is usually correlated (since they are typically from the same source).

At step 410, using a signal initially decided at step 408 as a reference signal, one or more 'optimal' coefficients of the fast-adaptive multi-tap digital filter are estimated by using for example well-known LS based algorithms.

At step 412, 'optimal' coefficients of the fast-adaptive multi-tap digital filter are updated with the one or more optimal coefficients estimated at step 410.

At step 414, the frequency-recovered signal of step 308 of FIG. 3 is equalized using the fast-adaptive multi-tap digital filter having updated 'optimal' coefficients. At step 416, a decision is made by the decision-making unit 236 with respect to the frequency-recovered signal equalized at step 414. It is to be understood that, to reduce the impact of imperfect decision accuracy, multiple iterations may be applied to each data block for filter coefficients update.

It should be noted that the method of FIG. 3 may also be used for the case where the long-memory CD-compensation filter is placed at the transmitter (i.e. pre-compensation). For the case where the long-memory CD-compensation filter is placed at the transmitter, there is no long memory filter placed at the receiver, so the LO will not be affected by the impact of long-memory filter. However, the transmitter source will experience only the fiber dispersion and the impact from fiber dispersion cannot be canceled out. Accordingly, in this case, the interaction between the fiber dispersion and the signal source phase noise will be similar to the interaction between the LO and the CD-compensating filter and therefore can also be mitigated by using the proposed method.

It should also be noted that the method of FIG. 3 can be easily extended to future space division multiplexing (SDM) systems, where not only a long-memory filter is required for fiber CD compensation, but a multi-input multi-output (MIMO) equalizer having a substantial length may also be needed (e.g. the use of few-mode or coupled multi-core fibers) for modal dispersion compensation. In this case, the impairment caused by the interaction between the long MIMO equalizer and the laser phase noise as well as the impairments caused by inter-mode nonlinear effects may be compensated by the proposed fast-adaptive multi-tap equalization method. It should be noted that the use of multiple spatial modes can be used to enable the improvement of the EPNI/FNE equalization performance by joint optimizing the equalizer coefficients over multiple spatial modes.

The impairment mitigation method described above has been numerically verified for a 7-channel 50 GHz-spaced 49 Gbaud PDM-16QAM system (operating at 392-Gb/s per channel bit rate, with Nyquist pulse shaping using a roll off factor 0.01) by using a block-by-block iterative LS algorithm. The transmission link consists of total 20 erbium-doped-fiber-amplified (EDFA) spans, and each span is composed of 100 km of large area fiber (dispersion coefficient and fiber loss are assumed to be 21 ps/nm/km and 0.18 dB/km, respectively) and EDFA-only amplification (noise figure is assumed to be 5 dB). No inline optical dispersion compensation is used for this simulation. For simplicity, polarization-mode dispersion (PMD) and polarization-dependent loss is not considered in this simulation. For the laser sources, we assume that the signal source and the LO have identical line width.

Figure 5:
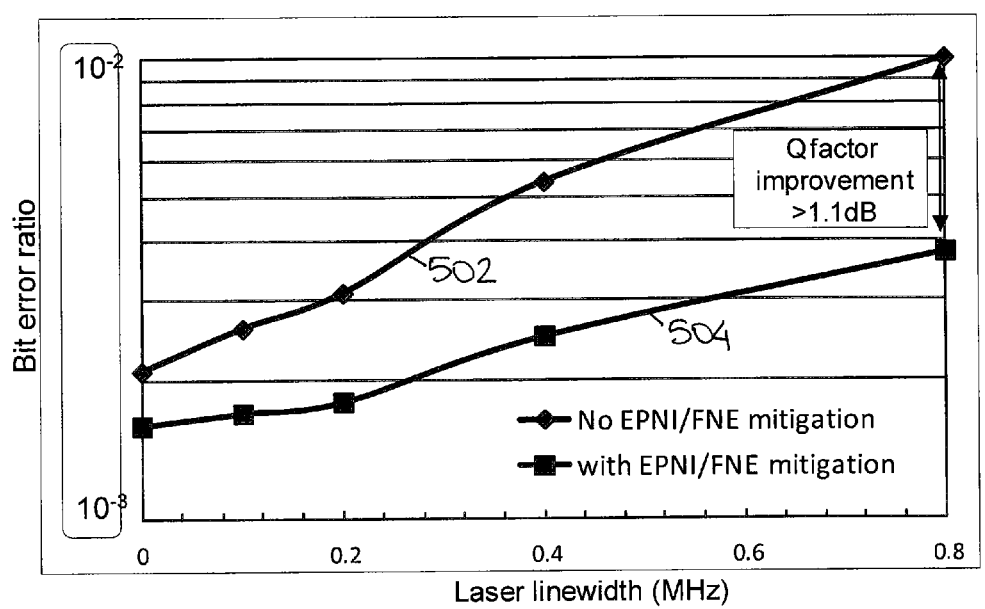
FIG. 5 illustrates an exemplary Bit-Error-Rate performance of a Wavelength-Division Demultiplexing system with and without using of the fast-adaptive multi-tap digital filter, according to one embodiment.

FIG. 5 illustrates an exemplary Bit-Error-Rate performance of a Wavelength-Division Demultiplexing system with and without using of the fast-adaptive multi-tap digital filter. In an exemplary embodiment, FIG. 5 shows the bit error ratio (BER) performance of the middle channel (ch.4) versus the laser line width at the optimal signal launch power 3 dBm/channel. Line 502 depicts the results generated using a conventional coherent receiver with a sliding-window based two-stage maximum likelihood phase recovery algorithm, while line 504 depicts the result generated by the proposed EPNI/FNE mitigation method using the fast-adaptive multi-tap digital filter, where a 5-tap Ts-spaced (where Ts denotes the symbol period) 1×1 linear equalizer operating with a block-by-block adaptive LS algorithm is used at each polarization for simultaneous phase recovery and additional EPNI/FNE distortion mitigation. In one embodiment, the block length is chosen to be 80 symbols (including 5 overlap symbols) and three iterations are applied for each data block, where the initial decision for each data block is made based on the same phase recovery algorithm used for the conventional coherent receiver (i.e. for the blue symbols).

Figure 6:
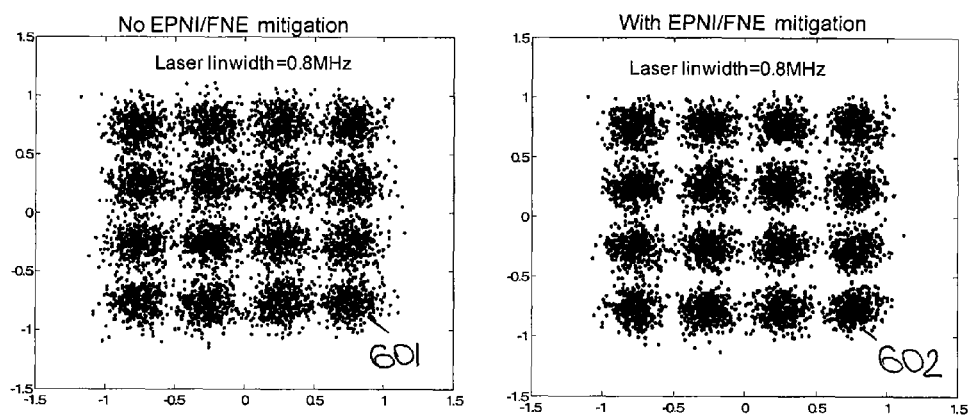
FIG. 6 shows exemplary simulated constellation diagrams for the Wavelength-Division Demultiplexing system with and without the use of the fast-adaptive multi-tap digital filter.

Based on the results illustrated on FIG. 5, a person skilled in the art will understand that the proposed method effectively mitigates the impairments caused by EPNI and FNE. For the case that there is no phase noise, i.e. the laser line width is zero, the proposed method improves the Q performance by 0.25 dB by mitigating the impairments caused by FNE. For a laser line width 0.8 MHz (a typical line width for the widely used DFB laser), the proposed method improves the Q performance by 1.15 dB by mitigating the impairments from both EPNI and FNE. A 1.1 dB Q performance improvement can translate into a transmission reach increase by approximately 30%. The performance improvement of the proposed method can also be clearly seen from the constellation diagrams shown in FIG. 6 where constellation diagram 601 illustrates the results generated using a conventional coherent receiver with a sliding-window based two-stage maximum likelihood phase recovery algorithm and where constellation diagram 602 illustrates the results generated by the proposed new EPNI/FNE mitigation method using the fast-adaptive multi-tap digital filter.

It is to be understood that the proposed fast-adaptive multi-tap digital filter can be implemented as a 1×1 linear filter for each polarization, or each spatial mode for an SDM system, where the filter coefficients may be optimized either independently for each polarization/spatial mode or optimized by jointly considering more than one polarizations/spatial modes. Furthermore, the proposed fast-adaptive multi-tap digital filter may also be implemented as a butterfly-configured N×N MIMO equalizer for joint optimization of multiple spatial modes (two orthogonal polarizations can be assumed as two spatial modes).

Figure 7:
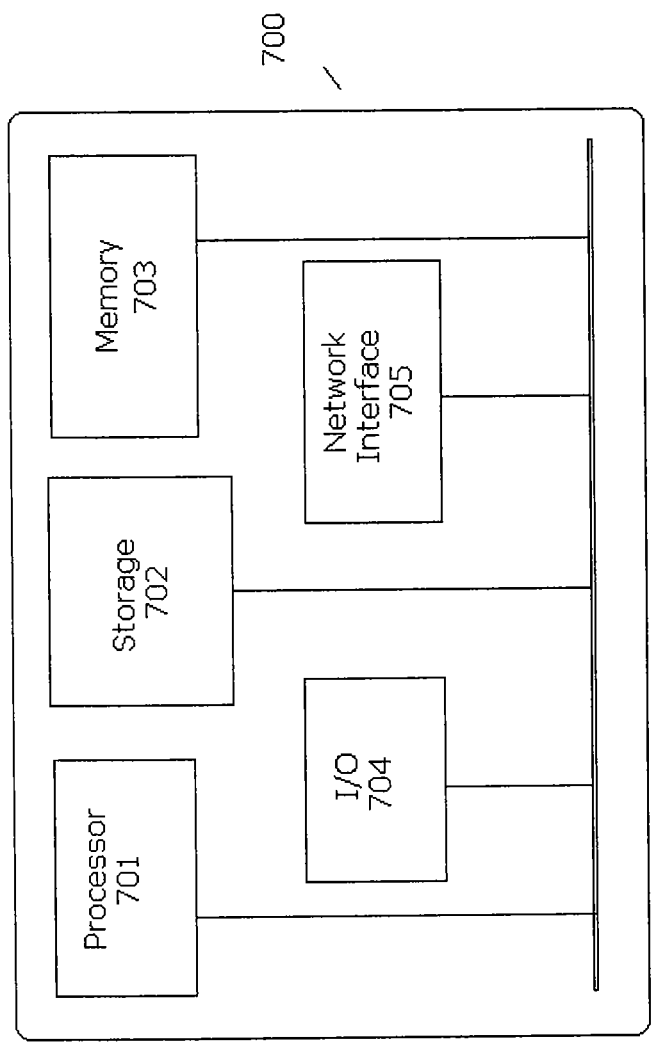
FIG. 7 illustrates a high-level block diagram of an exemplary computer that may be used for implementing a DSP-enabled coherent optical communication system and a method for optical impairment mitigation using the fast-adaptive multi-tap digital filter.

FIG. 7 illustrates a high-level block diagram of an exemplary computer that may be used for implementing a new DSP-enabled coherent optical communication system and a method for optical impairment mitigation using the fast-adaptive multi-tap digital filter. Computer 700 comprises a processor 701 operatively coupled to a data storage device 702 and a memory 703. Processor 701 controls the overall operation of computer 700 by executing computer program instructions that define such operations. The computer program instructions may be stored in data storage device 702, or other computer readable medium, and loaded into memory 703 when execution of the computer program instructions is desired. Thus, the steps of FIGS. 4 and 5 can be defined by the computer program instructions stored in memory 703 and/or data storage device 702 and controlled by processor 701 executing the computer program instructions. For example, the computer program instructions can be implemented as computer executable code programmed by one skilled in the art to perform an algorithm defined by the method steps of FIGS. 4 and 5. Accordingly, by executing the computer program instructions, the processor 701 executes an algorithm defined by the method steps of FIGS. 4 and 5. Computer 700 also includes one or more network interfaces 705 for communicating with other devices via a network. Computer 700 also includes one or more input/output devices 704 that enable user interaction with computer 700 (e.g., display, keyboard, mouse, speakers, buttons, etc.).

Processor 701 may include both general and special purpose microprocessors, and may be the sole processor or one of multiple processors of computer 700. Processor 701 may comprise one or more central processing units (CPUs), for example. Processor 701, data storage device 702, and/or memory 703 may include, be supplemented by, or incorporated in, one or more application-specific integrated circuits (ASICs) and/or one or more field programmable gate arrays (FPGAs).

Data storage device 702 and memory 703 each comprise a tangible non-transitory computer readable storage medium. Data storage device 702, and memory 703, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 705 may include peripherals, such as a printer, scanner, display screen, etc. For example, input/output devices 704 may include a display device such as a cathode ray tube (CRT), plasma or liquid crystal display (LCD) monitor for displaying information to the user, a keyboard, and a pointing device such as a mouse or a trackball by which the user can provide input to computer 700.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   compensating a signal using a linear filter thereby generating a first compensated signal;
   conducting a polarization recovery and residual dispersion compensation of the first compensated signal using an adaptive equalizer having a first adaptation rate thereby generating a second compensated signal;
   estimating a frequency offset by conducting a carrier frequency recovery of the second compensated signal and removing the frequency offset using a one-tap filter thereby generating a frequency-recovered signal;
   performing a phase recovery of the frequency-recovered signal using a fast-adaptive multi-tap digital filter with coefficients estimated based on a reference signal to generate a phase-recovered signal, the reference signal determined by removing an estimate of a carrier phase from the frequency-recovered signal; and
   demodulating the phase-recovered signal.

2. The method of claim 1, wherein the fast-adaptive multi-tap digital filter has a second adaptation rate that exceeds the first adaptation rate.

3. The method of claim 2, wherein performing a phase recovery further comprises:
   dividing the frequency-recovered signal into a plurality of data blocks;
   estimating the carrier phase for each of the plurality of data blocks using a common phase estimation algorithm;
   removing the estimate of the carrier phase estimated from each of the plurality of data blocks using the fast-adaptive multi-tap digital filter;
   identifying the reference signal within each of the plurality of data blocks, wherein the reference signal is the phase-recovered signal;
   estimating the coefficients of the fast-adaptive multi-tap digital filter using the reference signal;
   updating the coefficients of the fast-adaptive multi-tap digital filter;
   equalizing the frequency-recovered signal using the fast-adaptive multi-tap digital filter with the coefficients updated thereby generating an equalized signal; and
   identifying the equalized signal.

4. The method of claim 2, wherein the second adaptation rate is generated by a feed-forward-based adaptation algorithm.

5. The method of claim 1, wherein the signal comprises a digitized signal at a first orthogonal polarization and a digitized signal at a second orthogonal polarization.

6. The method of claim 1, wherein the frequency offset is a signal frequency offset between a source of the signal and a local oscillator.

7. The method of claim 1, wherein demodulating the phase-recovered signal comprises inputting the phase-recovered signal into a signal decision unit.

8. An apparatus comprising:
   a processor; and
   a memory to store computer program instructions, the computer program instructions when executed on the processor, cause the processor to perform operations comprising:
      compensating a signal using a linear filter thereby generating a first compensated signal;
      conducting a polarization recovery and residual dispersion compensation of the first compensated signal using an adaptive equalizer having a first adaptation rate thereby generating a second compensated signal;
      estimating a frequency offset by conducting a carrier frequency recovery of the second compensated signal and removing the frequency offset using a one-tap filter thereby generating a frequency-recovered signal;
      performing a phase recovery of the frequency-recovered signal using a fast-adaptive multi-tap digital filter with coefficients estimated based on a reference signal to generate a phase-recovered signal, the reference signal determined by removing an estimate of a carrier phase from the frequency-recovered signal; and
      demodulating the phase-recovered signal.

9. The apparatus of claim 8, wherein the fast-adaptive multi-tap digital filter has a second adaptation rate that exceeds the first adaptation rate.

10. The apparatus of claim 9, wherein performing a phase recovery further comprises:
    dividing the frequency-recovered signal into a plurality of data blocks;
    estimating the carrier phase for each of the plurality of data blocks using a common phase estimation algorithm;

removing the estimate of the carrier phase estimated from each of the plurality of data blocks using the fast-adaptive multi-tap digital filter;

identifying the reference signal within each of the plurality of data blocks, wherein the reference signal is the phase-recovered signal;

estimating the coefficients of the fast-adaptive multi-tap digital filter using the reference signal;

updating the coefficients of the fast-adaptive multi-tap digital filter;

equalizing the frequency-recovered signal using the fast-adaptive multi-tap digital filter with the coefficients updated thereby generating an equalized signal; and identifying the equalized signal.

11. The apparatus of claim 9, wherein the second adaptation rate is generated by a feed-forward-based adaptation algorithm.

12. The apparatus of claim 8, wherein the signal comprises a digitized signal at a first orthogonal polarization and a digitized signal at a second orthogonal polarization.

13. The apparatus of claim 8, wherein demodulating the phase-recovered signal comprises inputting the phase-recovered signal into a signal decision unit.

14. A computer readable medium storing computer program instructions for optical impairment mitigation, which, when executed on a processor, cause the processor to perform operations comprising:

compensating a signal using a linear filter thereby generating a first compensated signal;

conducting a polarization recovery and residual dispersion compensation of the first compensated signal using an adaptive equalizer having a first adaptation rate thereby generating a second compensated signal;

estimating a frequency offset by conducting a carrier frequency recovery of the second compensated signal and removing the frequency offset using a one-tap filter thereby generating a frequency-recovered signal;

performing a phase recovery of the frequency-recovered signal using a fast-adaptive multi-tap digital filter with coefficients estimated based on a reference signal to generate a phase-recovered signal, the reference signal determined by removing an estimate of a carrier phase from the frequency-recovered signal; and demodulating the phase-recovered signal.

15. The computer readable medium of claim 14, wherein the fast-adaptive multi-tap digital filter has a second adaptation rate that exceeds the first adaptation rate.

16. The computer readable medium of claim 15, wherein performing a phase recovery further comprises:

dividing the frequency-recovered signal into a plurality of data blocks;

estimating the carrier phase for each of the plurality of data blocks using a common phase estimation algorithm;

removing the estimate of the carrier phase estimated from each of the plurality of data blocks using the fast-adaptive multi-tap digital filter;

identifying the reference signal within each of the plurality of data blocks, wherein the reference signal is the phase-recovered signal;

estimating the coefficients of the fast-adaptive multi-tap digital filter using the reference signal;

updating the coefficients of the fast-adaptive multi-tap digital filter;

equalizing the frequency-recovered signal using the fast-adaptive multi-tap digital filter with the coefficients updated thereby generating an equalized signal; and identifying the equalized signal.

17. The computer readable medium of claim 15, wherein the second adaptation rate is generated by a feed-forward-based adaptation algorithm.

18. The computer readable medium of claim 14, wherein the signal comprises a digitized signal at a first orthogonal polarization and a digitized signal at a second orthogonal polarization.

19. The computer readable medium of claim 14, wherein demodulating the phase-recovered signal comprises inputting the phase-recovered signal into a signal decision unit.

20. The computer readable medium of claim 14, wherein the frequency offset is a signal frequency offset between a source of the signal and a local oscillator.

* * * * *